United States Patent [19]
Rastocny

[11] 3,734,301
[45] May 22, 1973

[54] MERCHANDISE DISPLAY DEVICE

[75] Inventor: John Rastocny, Cliffside Park, N.J.

[73] Assignee: Diro Industries Corp., Union City, N.J.

[22] Filed: Aug. 31, 1971

[21] Appl. No.: 176,605

[52] U.S. Cl. ............... 211/177, 211/165, 248/188.7
[51] Int. Cl. ........................... A47f 5/02, A47f 5/10
[58] Field of Search ................. 211/177, 163, 164, 211/95, 115, 58, 57, 59, 166, 78, 70; 46/29; 40/125 H, 68; 248/188.7, 188.8

[56] References Cited

UNITED STATES PATENTS

| | | | |
|---|---|---|---|
| 695,964 | 3/1902 | Taggart | 211/163 |
| 1,695,618 | 12/1928 | Thompson | 211/164 |
| 1,747,951 | 2/1930 | Reichert | 248/165 X |
| 2,707,566 | 5/1955 | Eaton et al. | 211/177 X |
| 3,244,128 | 4/1966 | Rogalski et al. | 248/188.7 X |
| 3,547,275 | 12/1970 | Engel | 211/177 |

FOREIGN PATENTS OR APPLICATIONS

| 391,451 | 9/1965 | Switzerland | 211/177 |
|---|---|---|---|

*Primary Examiner*—Ramon S. Britts
*Attorney*—Emanuel R. Posnack

[57] ABSTRACT

A merchandise display device comprising an array of multi-branch display racks with rotatable and stationary components. A post, a multi-legged stand and a plurality of radial display branches are held in assembled relation by a plurality of connectors of identical construction. Each connector has an axial bore and a plurality of circumferentially positioned apertured portions, said branches being supported by said apertured portions, one of said connectors being rotatably mounted upon said post, another serving as the fixed juncture between said post and said stand.

1 Claim, 10 Drawing Figures

Patented May 22, 1973
3,734,301
3 Sheets-Sheet 1
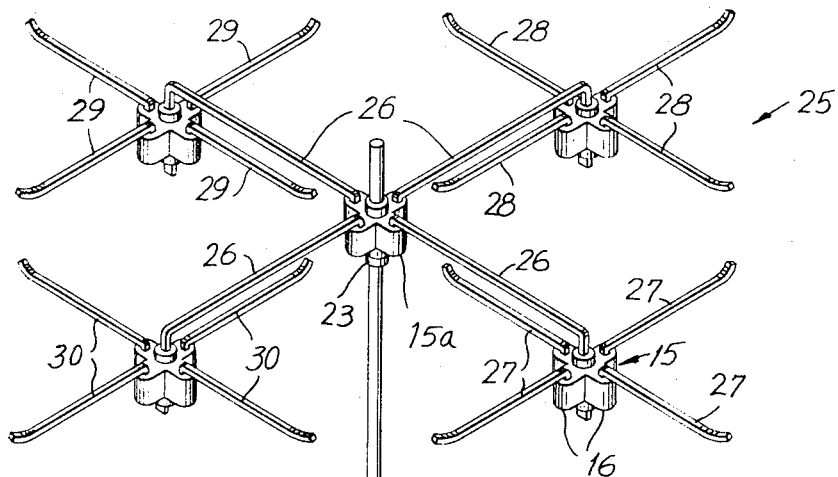
FIG. 1
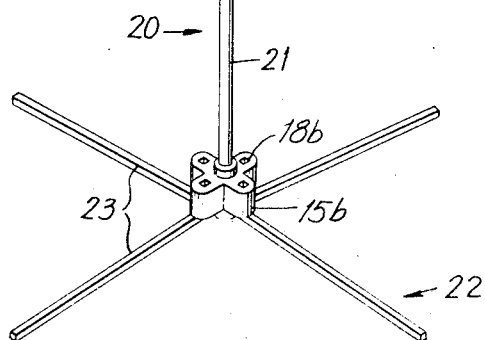
FIG. 2
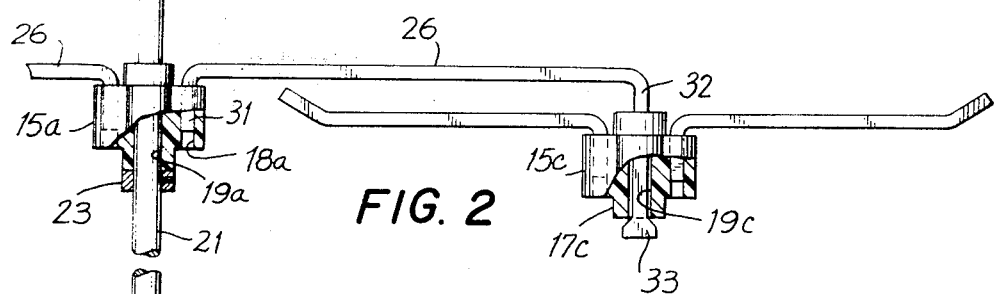
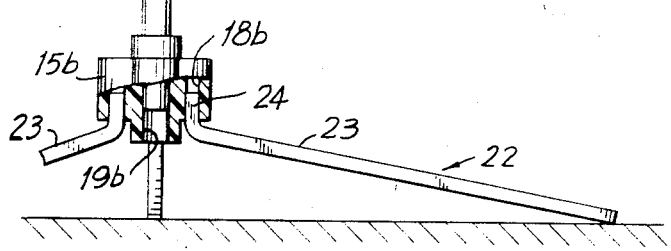
INVENTOR.
JOHN RASTOCNY
BY
ATTORNEY

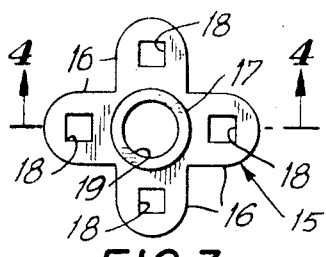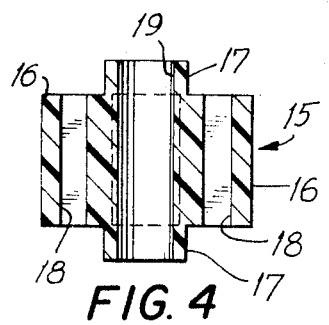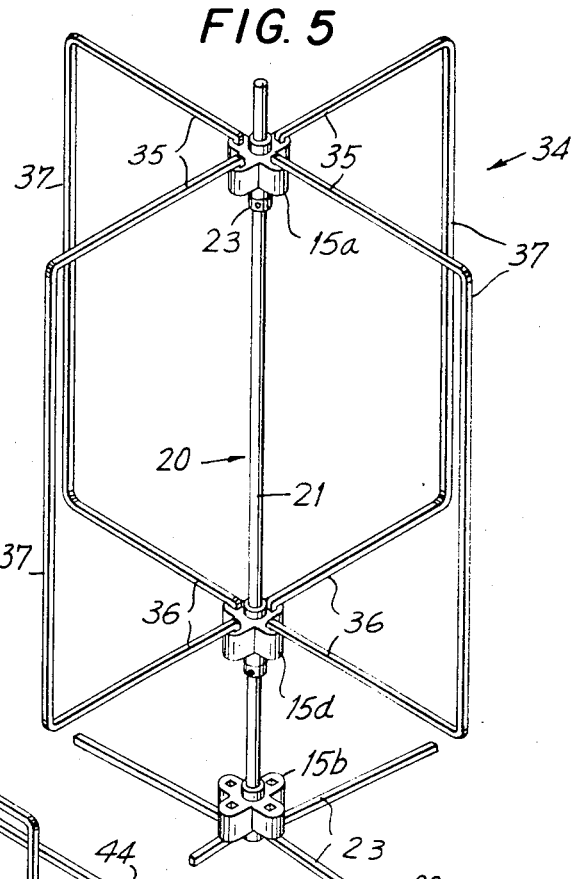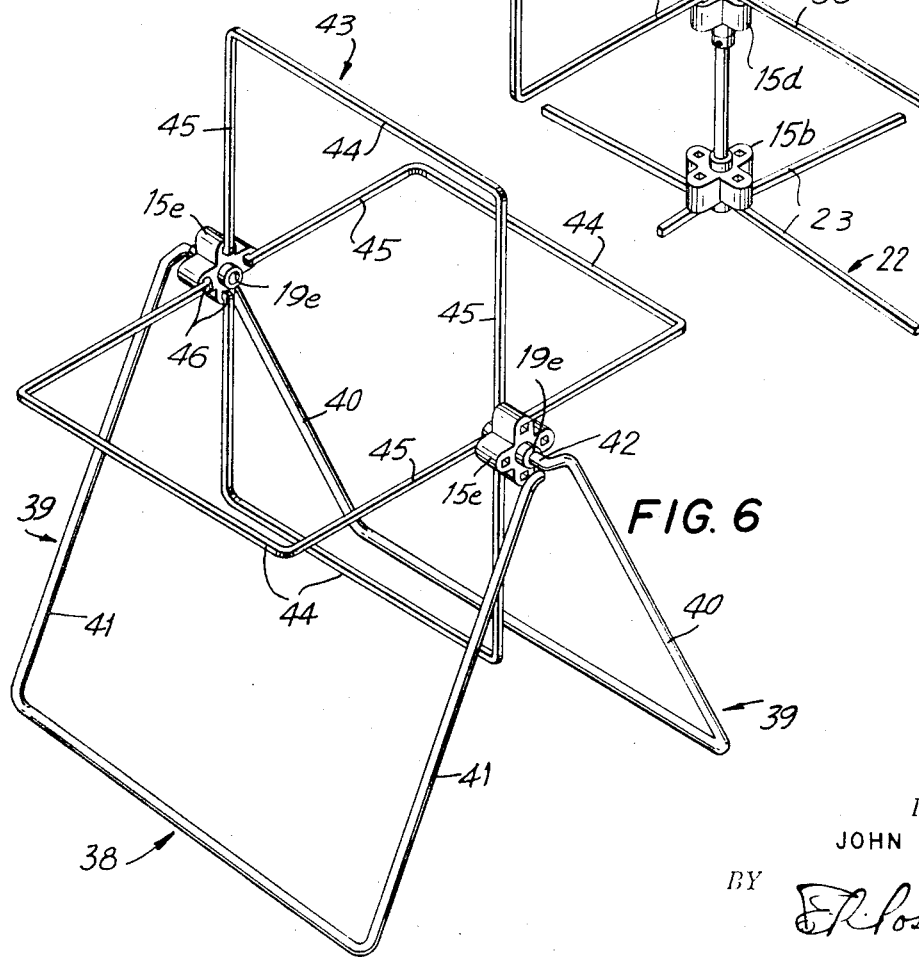

Patented May 22, 1973

INVENTOR.
JOHN RASTOCNY

BY
ATTORNEY

MERCHANDISE DISPLAY DEVICE

BACKGROUND OF THE INVENTION

1. The Field of the Invention

This invention relates to merchandise display devices — particularly, though not exclusively, to counter and floor multi-branch display racks with rotatable and stationary support members.

2. The Known Art

Display devices of the above-mentioned category are employed on sales counters, on the floors of stores and showrooms and in storefront windows to exhibit various items of merchandise, many of such devices having rotatable racks or "spinners" for convenient viewing of a plurality of items circumferentially arranged about a supporting post. It is a common practice to form supporting racks and their branches of wire or rods, the components being generally welded or bolted together, requiring time, effort and special skills in assembling the parts into a predetermined configuration. The welded displays, besides involving a costly fabrication technique, are uneconomical in that they are employable for displaying only a limited line of items because their permanent form renders then inconvertible to other configurations; and moreover, their fixed construction often renders them too bulky for economical shipment or storage. The conventional display devices that are formed by screwing or bolting together the constituent members not only require considerable assembly time, but require the careful handling of small fastener elements that can readily be lost and which often only fit into specific juncture points. And where rotatable racks are employed, special bearing members must be used and secured in place by special fastening means.

OBJECTIVES OF THE INVENTION

It is the objective of this invention to provide a multi-branch display device that is conveniently and economically adapted for supporting items of merchandise on rotatable or stationary racks, without the above-mentioned shortcomings of conventional devices of this category. More specifically, among the objects of this invention are the following: the provision of a multi-branch display device that can be readily assembled without the use of welding, screws, bolts, rivets or similar fasteners; the employment of novel connector members that serve the funtions of supporting or joining wire or rod components, that are also adapted to rotatably support spinning display members, and that can readily be operatively disconnected so as to permit the components of the display device to be re-arranged into other selected forms for use as supports of different arrays of merchandise or as toys; and the provision of a device of the said category that can be knocked down for convenient shipping and storage.

SUMMARY OF THE INVENTION

In a preferred form of this invention, a plurality of identical connector elements are employed, each of said connector elements having an axial bore and a plurality of apertured portions circumferentially positioned about the bore. One of said connector elements is rotatably mounted on a support comprising a post the bottom of which is connected by another one of said elements to a multi-legged stand adapted for positioning upon a floor or counter. The apertured portions of the first mentioned connector element support the bent inner terminal portions of a plurality of radially disposed support branches or arms, the bent outer terminals of said arms being in rotatable engagement with the respective axial bores of other of said connector elements, the apertured portions of each of the latter elements supporting another array of radial arms that are adapted to support items of merchandise.

Thus, in the above-described embodiment of the invention, identical connector elements are employed to rotatable support a plurality of sets of arms which constitute a rack for displaying merchandise, one of said connectors serving also as the stationary structural juncture between the post and its multi-legged stand. Since all the connectors are identical, they can be fabricated from a single mould — the single form eliminating the use of bolts, screws or other fasteners. The central connectors are slidably mounted over the post into their operative positions, the circumferential apertured portions slidably receiving therein the bent terminal portions of the corresponding arms. The device can be readily assembled and disassembled, and arrayed into various configurations of racks for displaying different arrays of items.

DESCRIPTION OF THE DRAWINGS

FIG. 1 is a perspective view of one embodiment of this invention.

FIG. 2 is an enlarged fragmentary side view of FIG. 1, the front support arm being omitted and fragments being shown in section for clarity.

FIG. 3 is a top plan view of one of the connector elements shown in FIGS. 1 and 2.

FIG. 4 is a section of FIG. 3 taken along line 4—4, a fragmentary portion being shown in elevation.

FIG. 5 is a perspective view of a modified form of this invention.

FIG. 6 is a perspective view of another modified form of this invention.

DESCRIPTION OF PREFERRED EMBODIMENTS

Figure 8:
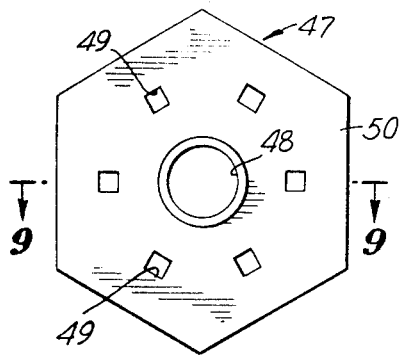
FIG. 8 is a top plan view of a form of connector element shown in FIG. 7.
Figure 9:
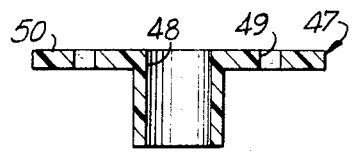
FIG. 9 is a section of FIG. 8 taken along line 9—9.

In the form of this invention illustrated in FIGS. 1 to 4, showing a multi-branched rotatable display device, the connector means employed therein comprises a plurality of identically shaped and proportioned connector elements 15, each having a plurality of radial wings 16 — here shown as four in number — and upper and lower centrally disposed bosses 17, said wings having apertured portions 18 extending therethrough and preferably, although not necessarily, of polygonal cross-section, there being an axial bore 19 extending through said bosses and the body of the connector element, said apertured portions being circumferentially disposed with respect to said axial bore.

and of said connector elements, the centrally positioned element 15a, is rotatable mounted on the support generally designated 20, said support comprising the post 21 nd the multi-legged stand 22, said post extending through the axial bore 19a of said connector element 15a and having secured thereto the collar 23 which is in underlying supporting engagement with the said connector element 15a. The bottom of said post 21 is force-fitted into the axial bore 19b of the connector element 15b, the legs 23 of said stand each having upwardly bent portions 24 extending upwardly and force-fitted into the respective apertured portions 18b of the connector element 15b, said connector element 15b thus serving as a supporting juncture for the said post and stand.

The said upper connector element 15a is in supporting engagement with the rack generally designated 25, said rack comprising an inner set of four support arms 26 and four outer sets of support arms 27, 28, 29 and 30, each of said outer sets comprising four arms.

The arms 26 of said inner set have their respective inner downwardly bent terminals 31 force-fitted into the respective apertured portions 18a of said central connector element 15a (see FIG. 2), the respective downwardly bent outer terminals 32 of said arms 26 extending through the axial bores 19c of the respective outer connector elements 15c, and having, in the particular form illustrated, the enlarged terminal stops 33 underlying and in supporting engagement with the respective bosses 17c.

The arrangement is hence such that the rack 24 with its said inner and outer sets of support arms is rotatable with respect to said support 20, thereby providing a firmly supported spinnable multi-branch display device, the said outer arms 27, 28, 29 and 30 being adapted to support selected items of merchandise. It is particularly noteworthy that the entire assembly, with both its fixed and rotatable components, is held together by a plurality of identical connector elements 15.

The embodiment illustrated in FIG. 5 employs the support 20 comprising the post 21 and the multi-legged stand 22 connected by the connector element 15b, the upper portion of said post having secured thereto the connector element 15a, all substantially in accordance with the above-described structure. This embodiment has an intermediate connector element 15d, like the said elements, secured to post 21 between said connector elements 15a and 15b. The rack generally designated 34 has a set of four upper radial support arms 35 the inner terminals of which are interengaged with the corresponding apertured portions of said connector element 15a and a set of four lower radial support arms 36 the inner terminals of which are interengaged with the corresponding apertured portions of said connector element 15d in the manner above described. The corresponding support arms of said upper and lower sets are connected to the respective struts 37, thereby giving rigidity to the rack which, as in the embodiment first above described, is rotatable about said support 20. The said support arms 35 and 36, as well as the said struts 37, are adapted to receive items of merchandise suspended from or clamped thereto.

The embodiment of FIG. 6 employs laterally opposite connector elements 15e identical to the connector elements employed in the two embodiments of this invention hereinabove described, the axial bores 19e of said two elements 15e being in horizontal axial alignment. The support 38 has two laterally opposite upright members 39 each with upwardly extending legs 40 and 41 rotatably supporting said two connector elements 15e. In the particular form shown in the drawings, each leg 40 has a portion 42 thereof bent horizontally and extending into the adjacent axial bore 19e, whereby both of said connector elements 15e are rotatable about said horizontal portions 42. The rack generally designated 43 comprises the four support arms 44 each having laterally opposite side portions 45 with inner bent terminal portions 46 interengaged with and supported by the corresponding apertured portions 18e of the said respective connector elements 15e. The rack 43 is thus rotatable with respect to said support 38, the support arms 44 being adapted to support suitably attached or suspended items of merchandise.

Figure 7:
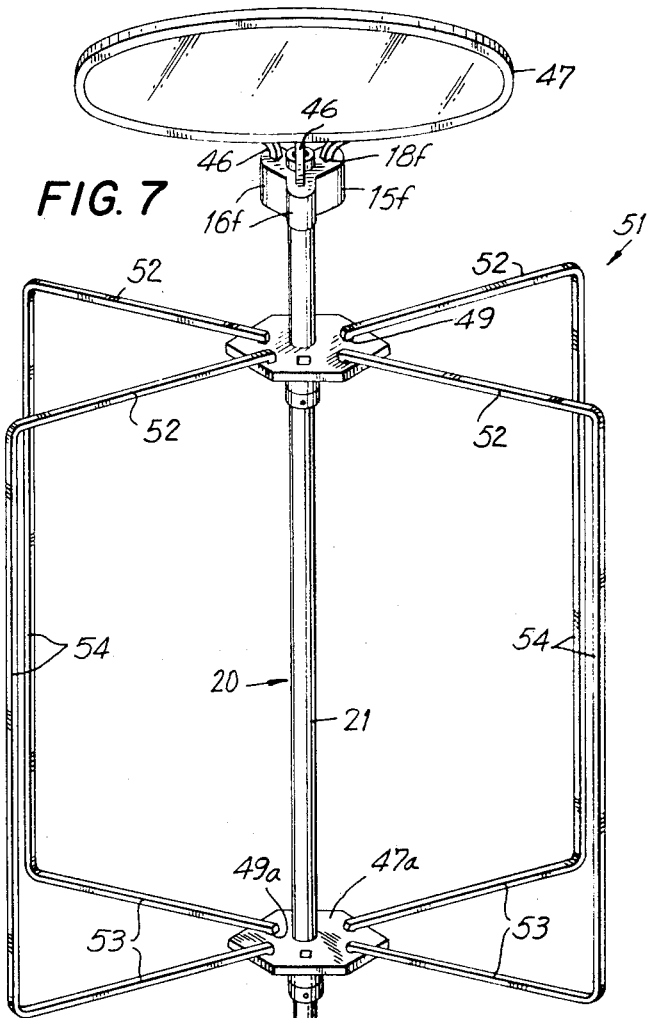
FIG. 7 is a perspective view of still another modification of this invention.

In the embodiment of FIG. 7 the support 20 including the post 21 and multi-legged stand 22 connected by the connector element 15b are substantially like the corresponding components of the embodiments shown in FIGS. 1 and 5. A three winged connector element 15f is secured to the top of the post 21, said connector element having an axial bore (not shown) like the bore 19 of the connector elements above described into which the top of post 21 extends. Each of said wings 16f has an apertured portion 18f therein, like the apertured portions 18 of the above described four-winged connector elements, said apertured portions operatively accommodating therein the respective legs 46 of a fixture, such as the mirror 47, whereby the connector element 15f supports said mirror thereabove.

Rotatably mounted over the post 21 are the respective upper and lower identical connector elements 47 and 47a, each having a central bore 48 and a plurality of circumferentially disposed apertured portions 49 disposed in the flat wall 50 thereof. The rack generally designated 51 is substantially like the rack 34 of FIG. 5, having a set of four upper radial support arms 52 the inner terminals of which are interengaged with the corresponding apertured portions 49 of connector element 47 and a set of four lower radial support arms 53 the inner terminals of which are interengaged with the corresponding apertured portions 49a of connector element 47a. The corresponding support arms of said upper and lower sets are connected to the respective struts 54, thereby giving rigidity to the rack 51 which is rotatable about the support 20.

Figure 10:
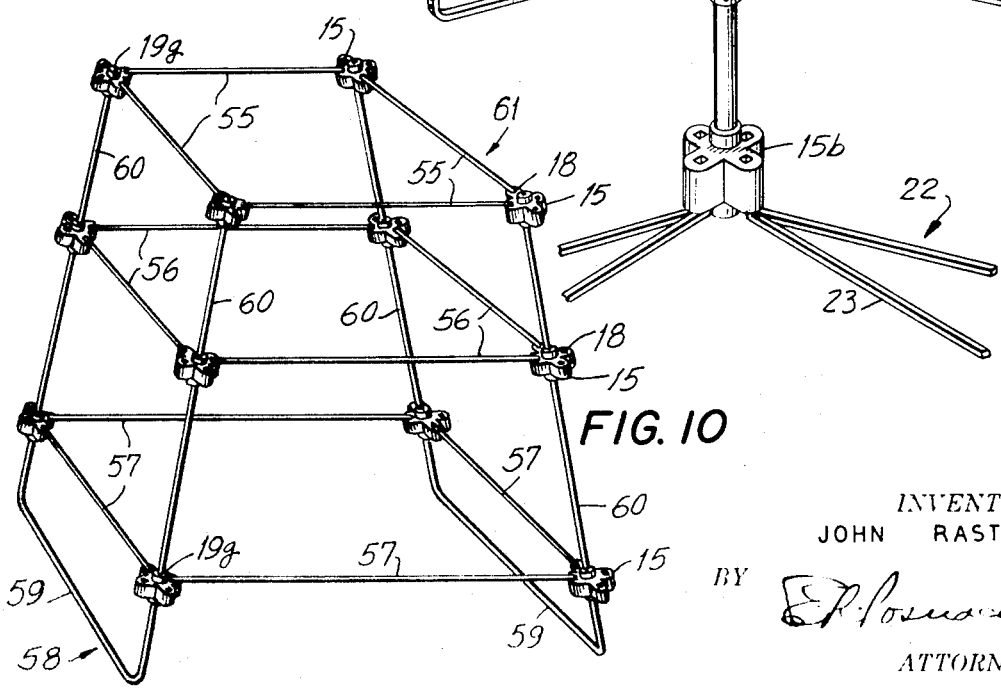
FIG. 10 is a perspective view of another form of this invention.

The embodiment of FIG. 10 is a merchandise display device having a plurality of identical connector elements 15, like the connector elements shown in FIGS. 1 and 2, and a rack generally designated 61. In the particular embodiment illustrated said rack comprises three horizontal tiers of support arms — an upper tier comprising the support arms 55, an intermediate tier comprising the support arms 56 and a lower tier comprising the support arms 57. The opposite ends of each of the said support arms are interengaged with the respective adjacent apertured portions 18 of the corresponding connector elements 15, each connector element forming a corner of one tier. The arrangement is such that there are a plurality of three sets of corner connector elements with their bores in axial alignment. The support for this structure, generally designated 58, has two bases 59 and four upwardly extending posts 60, each post having portions thereof extending through and secured to the respective bores 19g of the corresponding set of three axially aligned corner connector elements. The entire device thus forms a rigid structure with the components held in assembled relation by a plurality of identical connector elements, each of said support arms being adapted to support selected items of merchandise.

In the above description, the invention has been disclosed merely by way of example and in preferred manner; but obviously many variations and modifications may be made therein. It is to be understood, therefore, that the invention is not limited to any particular form or manner of practicing same.

I claim:

1. A mechanical display device comprising connector means, a support therefor, and a rack having a plurality of support arms carried by said connector means, said connector means having at least one connector element with a central bore therein and a plurality of circumferentially disposed apertured portions, said support having a portion thereof extending into and interengaged with said central bore for supporting said connector element, said support arms being supportably interengaged with said respective apertured portions, whereby said arms are operatively supported by said support and connector element, said connector means having a plurality of identically shaped and proportioned connector elements, said rack comprising a plurality of sets of said support arms, one of said sets being an inner set and the other sets being outer sets, said first-mentioned connector element being centrally positioned, certain of the other of said connector elements being outwardly and circumferentially disposed with respect to said first-mentioned connector element, the apertured portions of said first-mentioned connector element being in operative supporting engagement with the inner terminals of the arms of said inner set, the outer terminals of said latter arms being supportingly interengaged with the respective bores of corresponding ones of said outwardly positioned connector elements, the support arms of said respective outer sets being supportably interengaged with the respective apertured portions of correspondingly positioned ones of said outwardly disposed connector elements, whereby the arms of all of said outer sets are adapted to support selected items of merchandise in circumferential relation to their respective coactively positioned connector elements, all of said outer sets being in circumferential relation to said centrally positioned connector element.

* * * * *